United States Patent Office 3,465,591
Patented Sept. 9, 1969

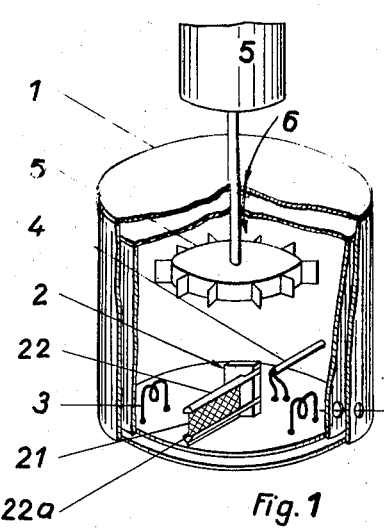

3,465,591
HUMIDITY MEASURING DEVICE
Christian Bachem, 170 Markt, 3424 St. Andreasberg, Germany, Günther John, 1 V.-Langen-Str., 3389 Braunlage, Germany, and Gustav Rust, 2 Schesischestrasse, 3424 St. Andreasberg, Germany
Filed July 13, 1967, Ser. No. 653,081
Int. Cl. G01n 25/56, 25/02
U.S. Cl. 73—336.5                                10 Claims

ABSTRACT OF THE DISCLOSURE

A humidity measuring device, particularly for dew-point measurements. The device comprises a chamber having an inlet and an outlet so that moist air can pass therethrough. An electrolytic resistor is arranged in the chamber exposed to the air and has a hygroscopic portion whose electrical conductivity varies in proportion to its moisture content. Variable heating means is arranged in the chamber and so positioned that it can heat the hygroscopic portion to varying temperatures to expel moisture therefrom. An operative connection is provided between the resistor and the heating means for varying the amount of heat emanating from the latter and as a directly proportional function of the conductivity of the hygroscopic portion.

Background of the invention

The present invention relates to measuring devices in general, and more particularly to humidity measuring devices. Still more specifically, the present invention relates to a dew-point measuring device.

Many of the computations involved in meteorology require an exact determination of the prevailing dew-point, that is of the temperature at which the water vapor present in the air saturates the air and begins to condense. A variety of devices for performing such measurements is therefore known in the art. These include devices provided with electrolytic sensors which incorporate a wick prepared with lithium chloride and surrounding a thermometer. The wick is equipped with a pair of wire electrodes connected to an alternating voltage and, when heated directly by the electrolytic current in the wick, the system dries up and reaches an equilibrium temperature which serves as a measure for the absolute humidity in the surrounding gas.

However, this system, as all others which have been known heretofore in this field, suffers from various disadvantages. Generally speaking all of these disadvantages can be reduced to a single common denominator, namely the fact that the systems either do not possess the necessary accuracy or, and this amounts essentially to the same problem, they do not react quickly enough to changes in ambient conditions so that the information obtained at any given time does not reflect an up-to-the-minute indication of prevailing conditions. Thus, in the type of system described above, which utilizes a wick impregnated with lithium chloride, it has been found that for dew-points above the ice point the equilibrium temperature of the system provides reasonably exact calibrations against the dew-point; however, below the ice point such other effects as different temperatures of the gas itself, or a change in ventilation of the wick impregnated with lithium chloride, assume ever-increasing importance because of their effect on the efficiency of the system. As a result, it has been found that below temperatures of −10° C. the readings obtained with such a system are already very much in doubt, and no useful readings can be obtained with such a system at temperatures below −20° C.

Readings which are this restricted and/or inaccurate at lower temperatures are, of course, not satisfactory and there has therefore been a long-standing need in this field for a device capable of measuring the dew-point more precisely and over a wider temperature range. However, prior to the present invention no such device has become known.

Summary of the invention

The present invention provides a measuring device which overcomes the disadvantages of the prior art.

More particularly, the present invention provides a dew-point measuring device which makes it possible to measure accurately the dew-point at temperatures ranging from any given elevated value down to below −40° C.

In the device according to the present invention the influence of the initial temperature and of the quantity of gas which enters the device is negligible down to very low absolute humidities.

An important advantage of the novel device according to the present invention is the fact that no time lag occurs between changes in the ambient conditions and the indication provided by the novel device, or if such time lag does occur, that it is so negligible as not to affect the accuracy and real-time status of the indications provided by the device.

One feature of the invention, briefly stated, consists in the provision of a humidity measuring device which comprises wall means defining a chamber. This chamber has an inlet and an outlet so that a moisture-containing gas, such as air, may pass through the chamber. Circuit means is provided and includes a resistor arranged in the chamber and comprising a hygroscopic portion which is exposed to the gas passing therethrough. In accordance with the invention this portion has an electrical conductivity which varies in proportion to its moisture content. Variable heating means is arranged also in the chamber and is so positioned as to be able to heat the hygroscopic portion to varying temperatures, it being understood that as such heating occurs moisture is expelled from this portion. Furthermore, there is an operative connection between the resistor and the heating means for the purpose of varying the amount of heat which emanates from the latter as a directly proportional function of the conductivity of the hygroscopic portion. Thus, an equilibrium condition is reached at which there are no more variations in the conductivity of the hygroscopic portion and in the amount of heat emanating from the heating means, or where such variations are very small and negligible, when the temperature of the hygroscopic portion is such that the partial vapor pressure of the moisture is expelled from the hygroscopic portion equals the partial vapor pressure of the moisture present in the ambient gas passing through the chamber.

In other words, the arrangement is such that the indications provided by the device become stable, i.e., the equilibrium point is reached, near a temperature at which the hygroscopic portion is nearly dry and its conductivity is very small and changes rapidly with its content of water, it being understood, of course, that the water or moisture content changes whenever a small deviation in the temperature of the hygroscopic portion occurs.

The novel features which are considered as characteristic for the invention are set forth in particular in the appended claims. The invention itself, however, both as to its construction and its method of operation together with additional objects and advantages thereof, will be best understood from the following description of specific embodiments when read in connection with the accompanying drawings.

Brief description of the drawing

FIG. 1 is a somewhat schematic perspective view of one embodiment of the novel measuring device, with the housing thereof partially broken away for better understanding;

FIG. 2 shows the wiring diagram of the device illustrated in FIG. 1;

FIG. 3 is an axial section through another embodiment of the invention;

FIG. 4 is a view similar to FIG. 3, but showing yet an additional embodiment of the invention;

FIG. 5 is a detail view of the sensor used in the embodiment illustrated in FIG. 1; and FIG. 6 is a schematic illustration of an additional form of a sensor of the type used in the illustrated embodiments of the novel measuring device.

Description of the preferred embodiments

Discussing now the drawing in detail, and firstly FIGS. 1, 2 and 5 thereof, it will be seen that this first embodiment illustrates a device wherein a double-walled housing defines an interior cylindrical chamber 1. Evidently, a single wall is not excluded by this showing and the double wall can be provided if thermal insulation from the ambient atmosphere is necessary or desired. Disposed within the chamber 1, which may of course also have a configuration different from that illustrated, is what will hereafter be described as an electrolytic sensor, identified with reference number 2. This sensor 2 is in fact an electrolytic resistor comprising a hygroscopic portion in form of a flat wick 21 (see also FIG. 5) which is impregnated with lithium chloride. The hygroscopic properties of lithium chloride and its suitability as an electrolyte are well enough known not to require detailed discussion. The wick 21 is disposed between and in conductive contact with two electrodes, of which the upper is identified with reference numeral 22 and the lower is identified with reference numeral 22a. In the embodiment illustrated in FIG. 1, the lower electrode 22a is constructed in form of a trough so that moisture attracted into the wick 21 by hygroscopic action, and portions of the lithium chloride dissolved in such moisture, can run off into the trough constituted by the electrode 22a, to be susbequently available for re-absorption into the wick 21. In other words, as long as the device stays out of use at temperatures near the dew-point, the moisture with the lithium chloride dissolved therein is stored in this trough-shaped electrode 22a.

The sensor 2, which also comprises insulating members 2a holding the electrodes 22 and 22a and the wick 21 in predetermined relationship, is connected in series with a resistor 9 and an oscillator 8. A heater 3 is located proximal to the sensor 2 and is supplied with current via the output of an amplifier 10 which receives impulses from the sensor 2 at its input. Reference numeral 11 in FIG. 2 indicates a power supply and reference numeral 4 in both FIGS. 1 and 2 indicates a thermometer, for instance a conventional platinum wire embedded in a glass rod or the like, which is disposed in proximity to the sensor 2 and which, as shown in FIG. 2, is connected with a temperature indicator 12 located externally of the chamber 1.

The chamber 1 is provided with an inlet 6 for the moisture-carrying gas, and with an outlet 7 for this gas which leaves the chamber 1 after thorough admixture therein. If desired a fan arrangement such as that indicated with reference numeral 5 in FIG. 1 can be provided to facilitate agitation of the gas in the chamber 1.

When the device illustrated in FIG. 1 is initially started up, the electrolytic wick 21 is very moist because it has attracted a large amount of moisture from the ambient atmosphere by hygroscopic action. Accordingly, the conductivity of the wick 21 across the electrodes 22 and 22a is considerable, and because the supply of power to the heater 3 via the amplifier 10 is directly proportional to the conductivity of the wick 21, the heat emanating from the heater 3 is great. Thus, the interior of chamber 1 is heated rapidly and, as this heat is carried to the wick 21 by the constantly agitated gas within the chamber 1, the temperature of wick 21 rises and moisture is accordingly expelled therefrom. As the moisture content of wick 21 decreases, the conductivity of the wick decreases also or, putting this differently, its resistance increases. Thus, the signal which reaches the input of amplifier 10 from the sensor 2 becomes weaker and the amplifier 10 in turn reduces the supply of power to the heater 3 whereby the heat emanating therefrom also decreases. This continues until finally a point of equilibrium is reached at which the partial vapor pressure and moisture expelled from the wick 21 equals the partial vapor pressure of moisture present in the ambient gas. The temperature which now prevails in the chamber 1 is a measure for the dew-point of the gas in this chamber. Because of the constant agitation of the gas in the chamber 1, the thermometer 4 and the wick 21 will invariably have identical temperatures so that the temperature indicated by the thermometer 4 is reliably identical with the equilibrium temperature prevailing at the wick 21 and thus is an exact indication of this equilibrium temperature. To obtain the actual dew-point the temperature indicator 12 may be calibrated with a suitable scale for direct read-out of the dew-point, and this is well known and need not be further discussed.

It will be understood that the signal across the wick 21 and the electrodes 22 and 22a is not sufficient to heat the sensor 2, thus excluding a condition which in the prior art has always been a source of error. Also, because no such heating of the sensor 2 is required with the novel device, the thickness of the wick 21 can be kept very small as can indeed the surface area of the wick which need not be more than some 100th of a square inch.

With the device just discussed, sudden changes in the influx of new moisture-carrying gas into the chamber 1, that is sudden changes in the access of additional gas to the sensor 2, are of no consequence because of the constant strong turbulence of the gas which prevails within the chamber 1 at all times. The reaction time of this device is extremely small because of the high-speed interchange between the sensor 2 and the vapor pressure in the gas, and also because of the small time lag in thermal adjustments, so that the indications provided by the thermometer 4 to the indicator 12 are in effect real-time indications.

Coming now to the embodiment shown in FIG. 3 it will be seen that the housing there is again identified with reference numeral 1 but comprises a plurality of wall portions which define a double outer wall and a tubular inner wall so that air entering at the inlet 6 and flowing in the direction of the outlet 7, as indicated by the various arrows, will pass both through the space defined within the tubular inner wall 1a and through the annular clearance defined between this annular inner wall and the outer wall 1a of the housing. In this embodiment the heater 3 is so disposed as to be located in the path of air coming through the inlet 6, preferably under the influence of a non-illustrated blower, whereby this air is heated. The sensor 2 and the thermometer 4 are located within the space defined by the inner tubular wall 1a. As seen in FIG. 3, the construction of the sensor 2 and thermometer 4 and their arrangement relative to one another, is different from that shown in FIG. 1. Because it is necessary that both the sensor 2 and the thermometer 4 be at identical temperatures, in order to obtain exact dew point readings, the sensor and the thermometer in the embodiment of FIG. 3 are grouped together. They comprise a metallic envelope 20 of tubular configuration within which the thermometer 4 is disposed accessible to the ambient air. The envelope 20 constitutes the equivalent of the first electrode 22 shown in FIG. 1 and is surrounded over part of its axial extension by a small ring 21 of insulating material. The ring 21, in turn, is surrounded by an annular second electrode which constitutes the electrode 22a and which, together with the ring 21, defines a small trough for electrolyte solution, as discussed above with respect to FIG. 1. The electrolyte is disposed on the upper surface of the ring 21, that is at that end face of the ring which faces in the direction towards the outlet 7 in the embodiment illustrated in FIG. 3, and this electrolyte layer which is not identified specifically with a reference numeral, is of course in contact both with the metallic envelope-electrode 20 and the second electrode 22a.

As already pointed out the incoming air or gas enters through the inlet 6 and is heated by the heater 3. It may then pass by convection or thermal drift upwards towards the outlet 7, or if a fan is provided in the vicinity of the inlet 6 it will of course be forced to move towards the outlet 7 by the action of the fan. The interchange between the sensor and the vapor pressure in the gas, and the thermal time lag, will be smallest in the embodiment of FIG. 3 if a fan is indeed provided, so that the accuracy of readings in response to sudden changes of humidity in the gas passing through the device of FIG. 3 will be greatest if a fan is employed.

A further embodiment of the novel device is shown in FIG. 4, and this is of particularly light-weight construction and compact dimensions, a fact which makes it especially suitable for use in radiosondes or similar carriers where there are rigid restrictions on size and weight of the equipment which is being carried. The embodiment shown in FIG. 4, it should be understood, is an enlargement on the order of 20:1 and the compactness of the here illustrated device will be evident from these size relationships. The wall means is in FIG. 4 identified generally with 1c and it will be seen that it defines a venturi-passage or chamber, at whose inlet end 6 there is arranged a heating wire 3 whereas in the region of the throat of the venturi-shaped passage there is arranged a sensor-thermometer combination in form of a very small bead thermistor 28 which is suspended from its terminals 30. Further provided are two electrodes 29 and 29a which are in contact with a film (not illustrated) of electrolyte disposed on the lacquer-covered surface of the thermistor 28. The operation of the device shown in FIG. 4 need not be further described because it is identical with that of the other embodiments, it being evident that the device will be so disposed that the gas will enter through the inlet 6 in the direction of the arrows, be heated by its movement past the heater 3, and leave through the outlet 7 of the venturi-shaped chamber.

Coming, finally, to FIG. 6, it will be seen that this illustrates another embodiment of a sensor for use in the various embodiments of my novel device as illustrated in the preceding figures. The sensor in FIG. 6 is again generally identified with reference numeral 2 and comprises two hook-shaped wire electrodes 35, 35a mounted on a member 37 of insulating material. The wick is here wound onto the hooks of the electrodes 35, 35a and is constituted by a thread 36 of a suitable material such as glass fiber, Teflon fiber (trademark) or the like. The wick 36 is, of course, impregnated with an electrolyte, such as lithium chloride, and the operation of the sensor 2 shown in FIG. 6 is the same as described previously.

It will be understood that each of the elements described above, or two or more together, may also find a useful application in other types of measuring devices differing from the types described above.

While the invention has been illustrated and described as embodied in a humidity measuring device, it is not intended to be limited to the details shown since various modifications and structural changes may be made without departing in any way from the spirit of the present invention.

Without further analysis, the foregoing will so fully reveal the gist of the present invention that others can by applying current knowledge readily adapt it for various applications without omitting features that fairly constitute essential characteristics of the generic or specific aspects of this invention.

What is claimed as new and desired to be protected by Letters Patent is set forth in the appended claims:

1. A humidity measuring device, particularly a dew-point measuring device, comprising, in combination, wall means defining a chamber having an inlet and an outlet for passage of a moisture-containing gas through said chamber; circuit means including a resistor arranged in said chamber and comprising a hygroscopic portion exposed to said gas, said portion having an electrical conductivity which varies in proportion to its moisture content; variable heating means arranged in said chamber spaced from but positioned for heating said portion to varying temperatures so as to expel moisture therefrom; and an operative connection between said resistor and said heating means for varying the amount of heat emanating from the latter as a directly proportional function of the conductivity of said hygroscopic portion, whereby an equilibrium condition is reached between variations in the conductivity of said portion and in the amount of heat emanating from said heating means, when the temperature of said portion is such that the partial vapor pressure of moisture expelled from said hygroscopic portion equals the partial vapor pressure of moisture present in the ambient gas.

2. A device as defined in claim 1, wherein said resistor is an electrolytic resistor.

3. A device as defined in claim 1, and further comprising temperature-indicating means arranged to indicate the temperature of said resistor.

4. A device as defined in claim 3, and further comprising fan means for promoting turbulence in the gas passing through said chamber.

5. A device as defined in claim 3, wherein heating means is arranged adjacent said inlet exposed to the incoming gas; said wall means comprising wall portions defining in said chamber a circuitous path for movement of the heated gas by thermal drift through said chamber and into contact with said hygroscopic portion.

6. A device as defined in claim 3, wherein said hygroscopic portion is a wick.

7. A device as defined in claim 6, wherein said wick is impregnated with lithium chloride.

8. A device as defined in claim 3, wherein said hygroscopic portion has an upper edge and a lower edge, said resistor comprising a first electrode extending along said upper edge in conductive relation therewith, and a trough-shaped second electrode extending along said lower edge in conductive relation with the same.

9. A device as defined in claim 3, wherein said resistor comprises a tubular first electrode and a tubular second electrode surrounding said first electrode with clearance, and wherein said hygroscopic portion is constituted by an annular member of insulating material disposed in the clearance between said electrodes and having an exposed surface contacting both of said electrodes and carrying a quantity of hygroscopic electrolyte material, said temperature indicating means being disposed within said first electrode.

10. A device as defined in claim 9, wherein said first electrode is arranged in substantial axial alignment with at least a portion of the path of said gas so as to facilitate flow of the gas through said first electrode and in contact with said temperature indicating means.

References Cited

UNITED STATES PATENTS

| | | | |
|---|---|---|---|
| 2,280,241 | 4/1942 | Keeler | 73—336.5 |
| 3,175,400 | 3/1965 | Amdur | 73—336.5 |
| 3,269,185 | 8/1966 | Francisco | 73—336.5 |

LOUIS R. PRINCE, Primary Examiner

DENIS E. CORR, Assistant Examiner

U.S. Cl. X.R.

73—17